(12) United States Patent
Senda

(10) Patent No.: US 9,981,589 B2
(45) Date of Patent: May 29, 2018

(54) VEHICULAR CONSOLE BOX

(71) Applicant: HONDA MOTOR CO., LTD., Tokyo (JP)

(72) Inventor: Ryusaku Senda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 14/609,955

(22) Filed: Jan. 30, 2015

(65) Prior Publication Data

US 2015/0217667 A1 Aug. 6, 2015

(30) Foreign Application Priority Data

Feb. 4, 2014 (JP) ................................. 2014-019683

(51) Int. Cl.
*B60N 3/10* (2006.01)
*B60R 7/04* (2006.01)
*B60R 11/00* (2006.01)

(52) U.S. Cl.
CPC ............... *B60N 3/107* (2013.01); *B60R 7/04* (2013.01); *B60R 2011/0007* (2013.01)

(58) Field of Classification Search
CPC ........ B60N 2/4686; B60N 3/10; B60N 3/101; B60N 3/105; B60N 3/107; B60R 7/04; B60R 7/08; B60R 2011/0007
See application file for complete search history.

(56) References Cited

U.S. PATENT DOCUMENTS

| 4,986,589 | A | * | 1/1991 | McNew | .................... B60R 7/04 224/275 |
| 7,341,297 | B2 | * | 3/2008 | Nakamura | ............. B60N 3/083 224/926 |
| 7,581,774 | B2 | * | 9/2009 | Abro | ......................... B60R 7/04 296/24.34 |
| 7,708,436 | B2 | * | 5/2010 | Lota | ....................... B60N 3/101 362/154 |
| 7,731,254 | B2 | * | 6/2010 | Lota | ......................... B60R 7/04 248/311.2 |

(Continued)

FOREIGN PATENT DOCUMENTS

| DE | 10138292 | A1 | * | 3/2003 | ........... B60N 2/4686 |
| DE | 102008058478 | A1 | * | 5/2010 | ............. B60N 3/101 |

(Continued)

OTHER PUBLICATIONS

Notification of Reasons for Refusal dated Mar. 8, 2016, issued in counterpart Japanese Patent Application No. 2014-019683, with English translation. (7 pages).

*Primary Examiner* — D Glenn Dayoan
*Assistant Examiner* — Paul Chenevert
(74) *Attorney, Agent, or Firm* — Westerman, Hattori, Daniels & Adrian, LLP

(57) ABSTRACT

A vehicular console box includes a console body that is open on an upper side and that is attached to a floor panel of a vehicle. The console body includes a bottom portion that is positioned on an upper surface of the floor panel and sidewall portions that each stand from a corresponding one of two ends in a vehicle width direction of the bottom portion. The sidewall portions include rails that extend in a front-rear direction, the rails supporting a drink holder so that the drink holder is slidable in the front-rear direction.

12 Claims, 8 Drawing Sheets

(56) References Cited

U.S. PATENT DOCUMENTS

| | | | |
|---|---|---|---|
| 7,766,408 B2 * | 8/2010 | Lota | B60N 2/4606 296/24.34 |
| 7,784,843 B2 * | 8/2010 | Lota | B60N 2/4686 296/24.34 |
| 7,806,451 B2 * | 10/2010 | Lota | B60R 7/04 296/24.34 |
| 8,528,956 B1 * | 9/2013 | Winiger | B60R 7/04 296/24.34 |
| 9,598,022 B1 * | 3/2017 | Medina Luna | B60R 7/04 |
| 2005/0224509 A1 * | 10/2005 | Dry | B60N 3/107 220/849 |
| 2011/0095556 A1 * | 4/2011 | Werner | B60N 3/105 296/24.34 |
| 2015/0343956 A1 * | 12/2015 | Hipshier | B60N 2/4686 296/37.8 |
| 2015/0352993 A1 * | 12/2015 | Bosma | B60N 3/103 224/544 |
| 2015/0353019 A1 * | 12/2015 | Skapof | B60R 7/04 248/311.2 |
| 2016/0304031 A1 * | 10/2016 | Hipshier et al. | B60R 7/04 |
| 2017/0088060 A1 * | 3/2017 | Buza | B60R 7/04 |

FOREIGN PATENT DOCUMENTS

| | | | | |
|---|---|---|---|---|
| DE | 102010053494 A1 * | 7/2011 | | B60N 3/102 |
| DE | 102010017609 A1 * | 12/2011 | | B60N 3/101 |
| DE | 102013217525 A1 * | 3/2015 | | B60N 2/4686 |
| EP | 1752333 A2 * | 2/2007 | | B60N 3/10 |
| FR | 2991929 A1 * | 12/2013 | | B60R 7/04 |
| JP | 62-43036 U | 3/1987 | | |
| JP | 05-338497 A | 12/1993 | | |
| JP | 10-226260 A | 8/1998 | | |
| JP | 2002-187473 A | 7/2002 | | |
| JP | 2003-011728 A | 1/2003 | | |

* cited by examiner

VEHICULAR CONSOLE BOX

CROSS REFERENCES TO RELATED APPLICATIONS

The present application claims priority under 35 U.S.C. § 119 to Japanese Patent Application No. 2014-019683, filed Feb. 4, 2014, entitled "Vehicular Console Box." The contents of this application are incorporated herein by reference in their entirety.

TECHNICAL FIELD

The disclosure relates to an improved vehicular console box.

BACKGROUND

In many vehicles, a vehicular console box that is capable of receiving belongings of an occupant is provided in a vehicle interior. There is a vehicular console box that includes a drink holder, which is provided on a console body having an open upper side, so that a beverage container can be received therein. A known technique related to such a vehicular console box is disclosed in Japanese Unexamined Patent Application Publication No. 2003-11728.

In the vehicular console box disclosed in Japanese Unexamined Patent Application Publication No. 2003-11728, a drink holder for receiving beverage containers is formed in a bottom portion, a small-articles box is provided above the drink holder so as to be slidable in a front-rear direction, and a lid is provided above the small-articles box so as to be swingable in an up-down direction.

Note that the beverage container that is supported by the drink holder is anticipated to be one with a low height such as a can of canned coffee. When a short beverage container is placed on the drink holder formed in the bottom portion, the beverage container will be supported at a position deep inside the console body. In such a case, the occupant needs to reach his/her hand deep into the console body in order to take out the beverage container, which is inconvenient.

SUMMARY

The disclosure provides a vehicular console box that allows a beverage container to be easily taken out therefrom even if the beverage container is low in height.

An aspect of the disclosure provides a vehicular console box that includes a console body that is open at an upper side thereof, the console body being attached to a floor panel of a vehicle; the console body including a bottom portion that is positioned on an upper surface of the floor panel, and sidewall portions that each stand on a corresponding one of two ends in a vehicle width direction of the bottom portion; rails that extend in a front-rear direction, the rails being included in the sidewall portion; and a drink holder that is slidably supported by the rails.

In one aspect, the bottom portion preferably includes a bottom portion side container support formed therein in a concave manner, the bottom portion side container support being capable of supporting a tall beverage container that is larger than a short beverage container that is supported by the drink holder, the drink holder preferably includes a holder side container support formed therein, the holder side container support being capable of supporting the short beverage container, the holder side container support and the bottom portion side container support preferably have a substantially circular shape in plan view, and, preferably, a diameter of the bottom portion side container support is larger than a diameter of the holder side container support.

According to the above-described aspect of the disclosure, rails are formed on the sidewall portions standing on the bottom portion and the drink holder is supported with the rails so as to be slidable in the front-rear direction. Since the sidewall portions are portions that stand on the bottom portion, the rails are positioned at a portion that is higher than the position of the bottom portion. Accordingly, the drink holder slides in the front-rear direction at a position that is higher than the position of the bottom portion. Accordingly, compared with a case in which the beverage container is supported at the bottom portion, the beverage container can be supported at a shallower position of the console body (above the bottom portion). Since the beverage container is disposed at the shallower position, an occupant can easily take out a short beverage container.

Additionally, the drink holder can be slid in the front-rear direction. When receiving a tall beverage container, the drink holder is retracted. By retracting the drink holder, the tall beverage container can be directly placed on an upper surface of the bottom portion. By placing the tall beverage container on the bottom portion that is positioned at a lower position, the tall beverage container can be taken out easily.

Preferably, the bottom portion side container support is formed in a concave manner in the bottom portion, and the diameter of the bottom portion side container support is larger than the diameter of the holder side container support. Generally, a tall beverage container has a large diameter. By making the diameter of the bottom portion side container support larger than the diameter of the holder side container support that can support a short beverage container, a tall beverage container can be suitably supported as well.

BRIEF DESCRIPTION OF THE DRAWINGS

The advantages of the disclosure will become apparent in the following description taken in conjunction with the following drawings.

DESCRIPTION OF THE PREFERRED EMBODIMENTS

Figure 1:
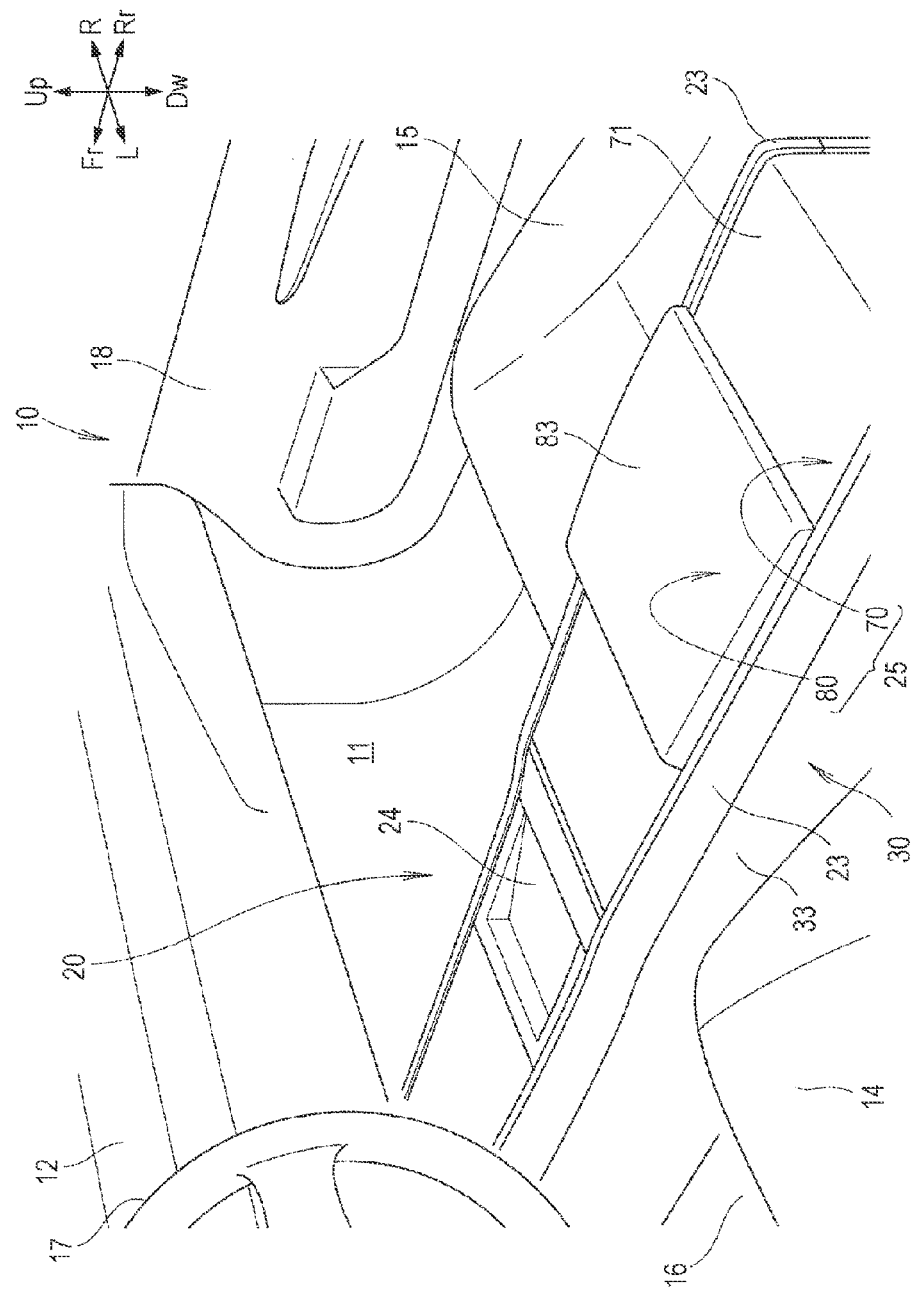
FIG. 1 is a perspective view of a vehicle on which a vehicular console box according to a first exemplary embodiment of the disclosure is mounted.

Hereinafter, exemplary embodiments of the disclosure will be described with reference to the attached drawings.

Note that in the description, "left" and "right" indicate the left and the right, respectively, relative to an occupant of an vehicle, "front" and "rear" indicate the front and the rear, respectively, with respect to the running direction of the vehicle. Furthermore, in the drawings, "Fr" represents the front, "Rr" represents the rear, "L" represents the left from a viewpoint of the occupant, "R" represents the right from the viewpoint of the occupant, "Up" represents up, and "Dw" represents down.

First Exemplary Embodiment

A structure of a vehicular console box according to a first exemplary embodiment will be described.

As illustrated in FIG. 1, an instrument panel 12 is provided in a vehicle width direction across a front portion of a vehicle interior 11 of a vehicle 10. A vehicular console box 20 (hereinafter denoted as a "console box 20") is arranged from the middle of the instrument panel 12 towards the rear side of the vehicle 10. Seats 14 and 15 on which occupants sit are provided so as to interpose the console box 20 therebetween. The console box 20 divides the vehicle interior 11 and is attached to a floor panel 16.

A steering wheel 17 for steering the vehicle 10 is attached to a left end portion of the instrument panel 12. The seat 14 disposed behind the steering wheel 17 is a driver seat. On the other hand, the seat 15 disposed at the right side of the driver seat with the console box 20 in between is a front passenger seat. A door 18 is attached to a vehicle body in a swingable manner on a vehicle exterior side of the seat 15. The console box 20 will be described in detail with reference to FIG. 2 and the succeeding figures.

Figure 2:
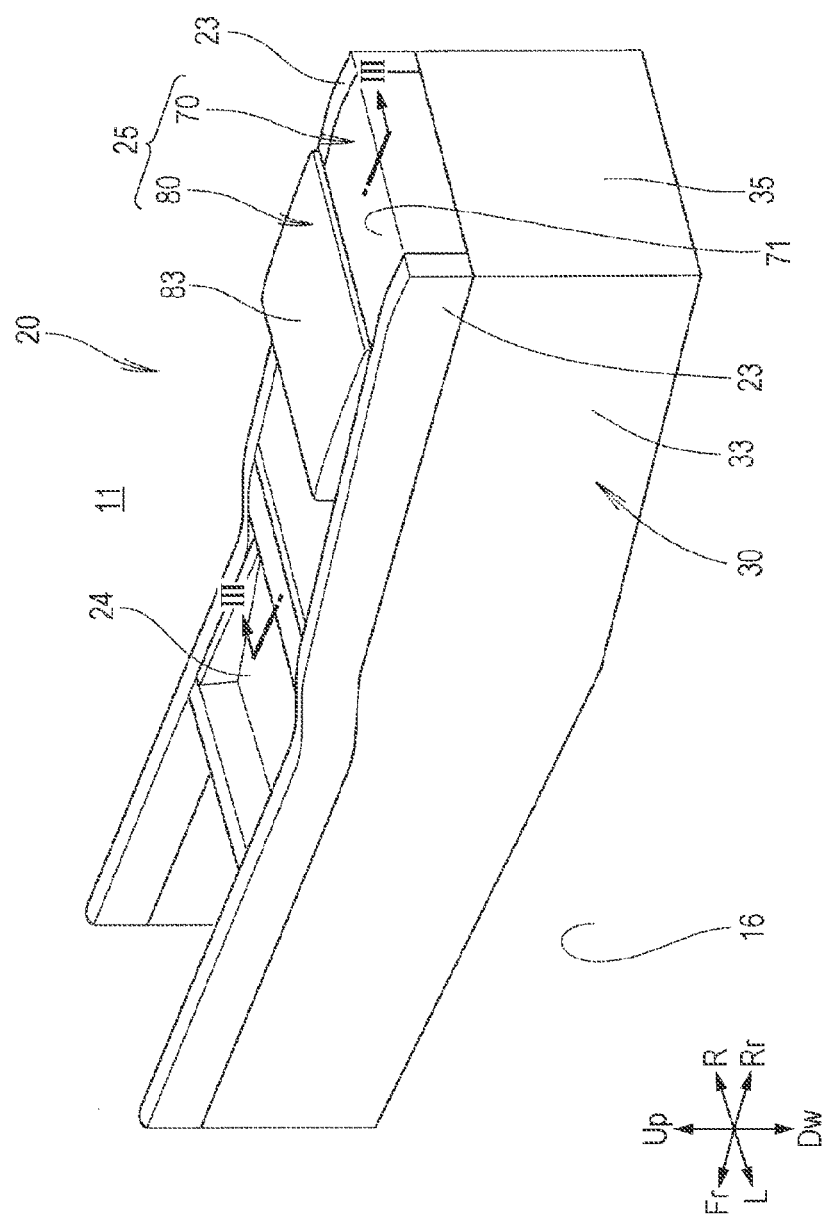
FIG. 2 is a perspective view of the vehicular console box illustrated in FIG. 1.

As illustrated in FIG. 2, as regards the console box 20, a console body 30, the upper portion of which is open allowing the belongings of the occupants to be received therein, is attached on the floor panel 16, and support plates 23 and 23 extend in the front-rear direction at left and right upper edge portions of the console body 30. A small-articles placing portion 24 and an armrest 25 on which an elbow of the occupant is placed are disposed in this order from the front between the support plates 23 and 23.

Figure 3:
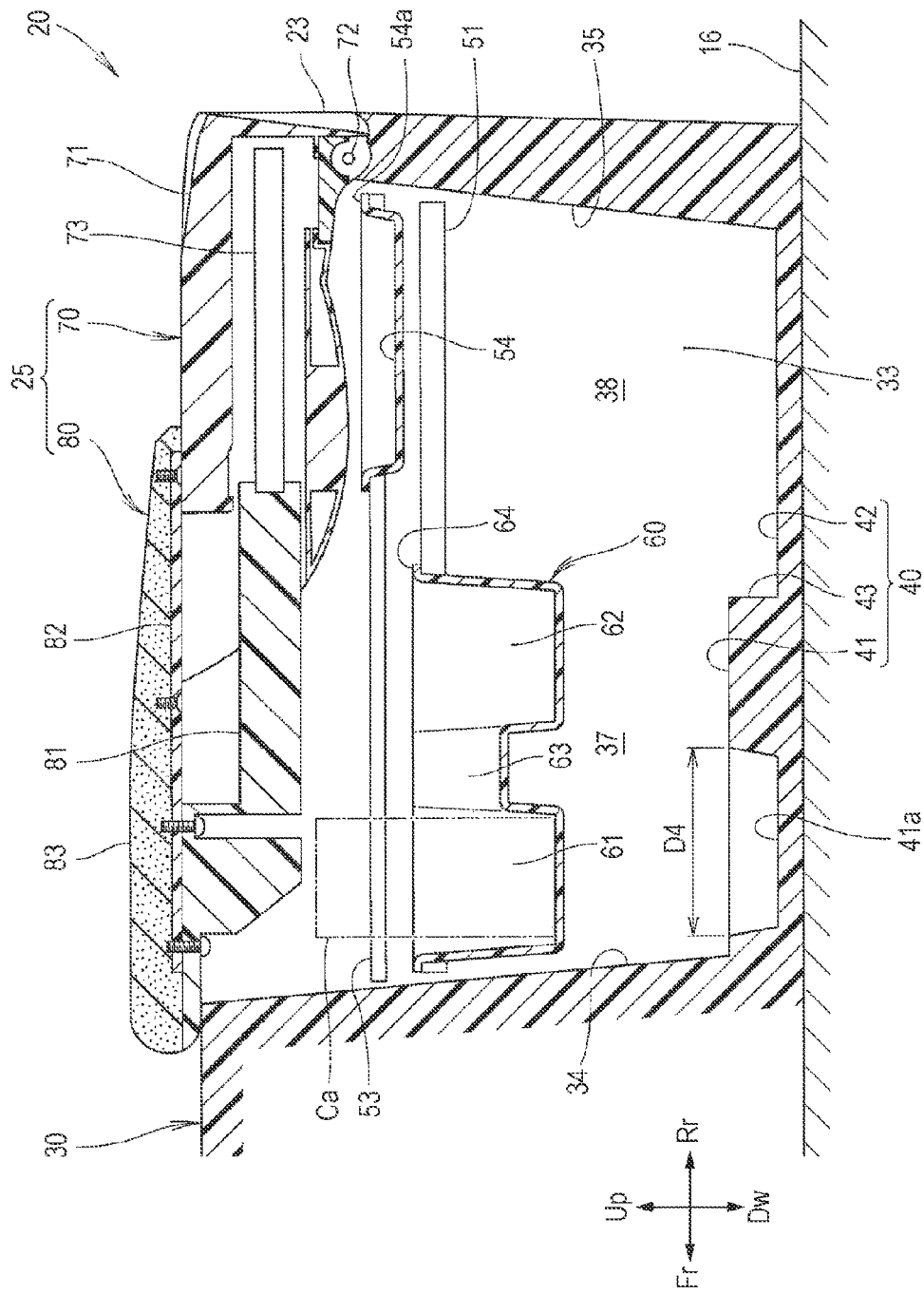
FIG. 3 is a cross-sectional view taken along line III-III of FIG. 2.

As illustrated in FIG. 3, the armrest 25 may be referred to as a lid that is capable of opening and closing the opening of the console body 30. The console body 30 includes a bottom portion 40 that is positioned on the upper surface of the floor panel 16, sidewall portions 33 (only the right side wall portion 33 is illustrated) that stand on the left and right sides of the bottom portion 40, a front wall portion 34 that stands on the front end of the bottom portion 40 and that extends in the upper front direction, and a rear wall portion 35 that stands on the rear end of the bottom portion 40 and that extends in the upper rear direction. The console body 30 may be formed in an integral manner by injection molding.

The bottom portion 40 includes a front portion 41 that is formed on the front side, a flat rear portion 42 that is formed at the rear of the front portion 41, heights of the front portion 41 and the rear portion 42 being different from each other in the front-rear direction, and a step portion 43 that is formed in a substantially perpendicular manner so as to connect the front portion 41 and the rear portion 42 to each other. Hereinafter, the storage space of the belongings above the front portion 41 is referred to as a front chamber 37 and the storage space of the belongings above the rear portion 42 is referred to as a rear chamber 38, as required.

A bottom portion side container support 41a that can support a tall beverage container is provided in the vicinity of the front end of the front portion 41 so as to extend downwardly in a concave manner. The bottom portion side container support 41a has a circular truncated cone shape whose diameter continuously decreases as it extends downwardly.

The circular truncated cone shaped allows die cutting to be facilitated. Furthermore, a circular truncated cone shaped cup that has the same cone angle in cross-sectional view can be reliably supported. In order to allow a tall beverage container to be supported at a higher position, the front portion 41 is formed to a height that is higher than the height of the rear portion 42. The front chamber 37 that is formed above the front portion 41 may be denoted as a portion whose objective is to receive a beverage container therein.

The rear portion 42 is formed at the rear of the front portion 41 and at a position that is lower than the position of the front portion 41. By forming the rear portion 42 at the position that is lower than the position of the front portion 41, the rear chamber 38, which is formed above the rear portion 42, that is larger than the front chamber 37 can be obtained. The rear chamber 38 that is formed above the rear portion 42 is a portion whose objective is to receive belongings other than the beverage container therein.

The step portion 43 stands on the front end of the rear portion 42. The step portion 43 serves as a stopper that restricts the belongings received in the rear chamber 38 from moving into the front chamber 37 when the belongings moves forward while the vehicle is being driven. Beverage containers are received in the front chamber 37. There may be cases in which water droplets adhere on the outer periphery of the beverage container. Restricting the belongings from moving into the front chamber 37 is beneficial in preventing the water droplets from being transferred onto the belongings.

By constituting the bottom portion 40 with the front portion 41 and the rear portion 42 that have different heights with respect to each other, the front chamber 37 and the rear chamber 38 that are formed above the front portion 41 and the rear portion 42, respectively, can be formed so as to have adequate shapes according to the objects thereof. This allows a variety of types of belongings to be efficiently received.

Figure 4:
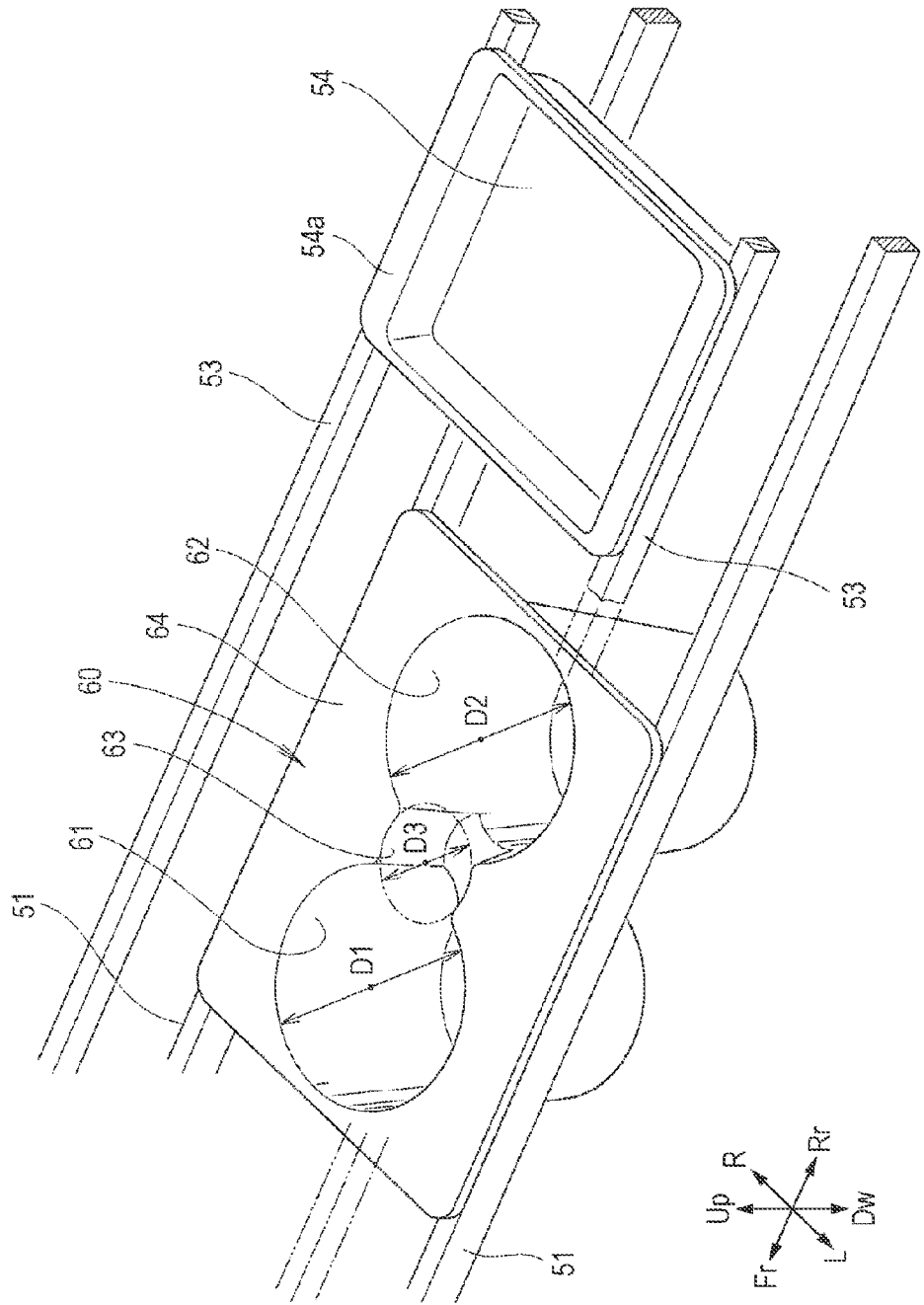
FIG. 4 is a perspective view of drink holder rails, a drink holder, tray rails, and a small articles tray that are illustrated in FIG. 3.

Referring also to FIG. 4, drink holder rails 51 and 51 (rails 51 and 51) extend through substantially middle portions of the sidewall portions 33 in the height direction and in most of the sidewall portions 33 in the front-rear direction. A drink holder 60 bridges upper surfaces of the drink holder rails 51 and 51.

Tray rails 53 and 53 extend above the left and right drink holder rails 51 and 51 and in most of the sidewall portions 33 in the front-rear direction. A small articles tray 54 that is capable of receiving small articles, such as small change, bridges upper surfaces of the tray rails 53 and 53.

Metal or resin can be employed as the material of the drink holder rails 51 and 51. As a method of fixing the drink holder rails 51 and 51 to the sidewall portions 33, a method such as adhering the drink holder rails 51 and 51 to the sidewall portions 33 with double-sided tapes, fixing the drink holder rails 51 and 51 to the sidewall portions 33 with self-tapping screws, or, further, combination of the above can be employed. The same applies to the tray rails 53 and 53 and detailed description thereof is omitted. Note that regarding the material of the tray rails 53 and 53 and the fixing method thereof, a material and a fixing method that are different from those of the drink holder rails 51 and 51 may be employed.

The drink holder 60 is a resin member that is capable of sliding above the drink holder rails 51 in the front-rear direction. A short beverage container Ca is supported by the drink holder 60.

Three holder side container supports 61 to 63 that are each capable of supporting a short beverage container Ca are continuously formed in the drink holder 60.

Additionally, a flange 64 is formed in the horizontal direction from the upper edges of the holder side container supports 61 to 63 in an integral manner. An underside of the flange 64 is in contact with upper surfaces of the drink holder rails 51 and 51.

The holder side container supports 61 to 63 include a first holder side container support 61 that is formed in the front portion and that has a circular shape in plan view, a second holder side container support 62 that is formed in the rear portion and that has a circular shape in plan view, and a third holder side container support 63 that is formed so as to communicate the first holder side container support 61 and the second holder side container support 62 to each other.

The holder side container supports 61 to 63 each have a substantially circular shape in plan view. Note that each of the substantially circular shapes does not necessarily require all of the portions to be a continuous circle. In other words, if loci of circles drawn with given center points each coincide with a rim of a corresponding one of the holder side container supports 61 to 63 at at least a portion and if the cylindrical shaped or circular truncated cone shaped beverage containers can be supported by the relevant holder side container supports 61 to 63, it can be said that the shape of each of the holder side container supports 61 to 63 has a substantially circular shape in plan view. As is the case of the third holder side container support 63, even if the circle is intermittent at two portions, the third holder side container support 63 can support the beverage container so that the beverage container does not tip over when the third holder side container support 63 receives a beverage container that has a substantially same diameter as a diameter D3 of the rim of the third holder side container support 63; accordingly, it can be said that the third holder side container support 63 has a substantially circular shape in plan view.

A diameter D1 of the first holder side container support 61 and a diameter D2 of the second holder side container support 62 are configured to have the same length. On the other hand, the diameter D3 of the third holder side container support 63 is smaller than the diameter D1 and the diameter D2. Additionally, the third holder side container support 63 is formed so that the depth thereof is shallower than those of the first holder side container support 61 and the second holder side container support 62.

For example, the first holder side container support 61 and the second holder side container support 62 are each anticipated to receive a short beverage container Ca, such as a can including a canned coffee. Meanwhile, the third holder side container support 63 is anticipated to receive an even shorter beverage container. For example, the third holder side container support 63 may receive a bottle of energy drink.

Note that the diameters D1 to D3 of the first to third holder side container supports 61 to 63 are all smaller than a diameter D4 of the bottom portion side container support 41a. In other words, the diameter D4 of the bottom portion side container support 41a is larger than the diameters D1 to D3 of the holder side container supports 61 to 63. Generally, a diameter of a short beverage container is small and a diameter of a tall beverage container is large. The holder side container supports 61 to 63 are each anticipated to support a short beverage container and the diameters D1 to D3 thereof are set smaller. The bottom portion side container support 41a is anticipated to support a tall beverage container and the diameter D4 is set larger.

The small articles tray 54 is a resin member that is capable of sliding above the tray rails 53 and 53 in the front-rear direction. A tray flange 54a is formed in a continuous manner on the peripheral edge of the small articles tray 54. An underside of the tray flange 54a is in contact with upper surfaces of the tray rails 53 and 53.

Note that the drink holder rails 51 and 51 may be formed in an integral manner with the sidewall portions 33 so as to hollow out the sidewall portions 33 towards the outside. In other words, the drink holder rails 51 and 51 do not have to be separate members as long as the drink holder rails 51 and 51 can support the drink holder 60 in a slidable manner. The same applies to the tray rails 53.

Figure 5:
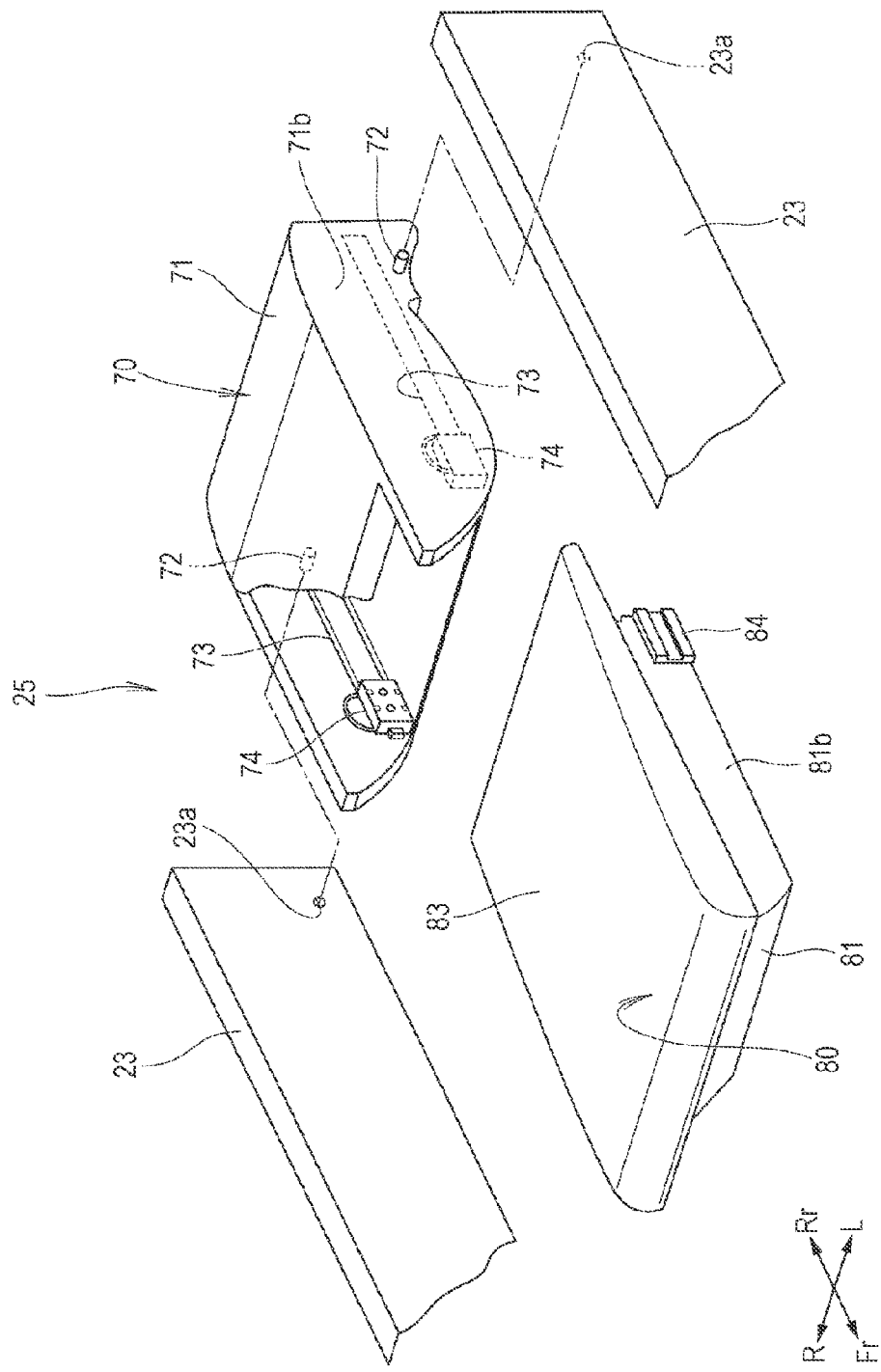
FIG. 5 is an exploded perspective view of support plates and an armrest illustrated in FIG. 2.

As illustrated in FIGS. 3 and 5, the armrest 25 includes a swing portion 70 that is supported in a swingable manner at the rear portions of the left and right support plates 23 and 23, and a slide portion 80 that is attached to the swing portion 70 so as to be slidable in the front-rear direction with respect to the swing portion 70. The swing portion 70 and the slide portion 80 are configured with substantially the same length in the front-rear direction.

The swing portion 70 includes a box-shaped swing-portion body 71 that is open towards the front, pin-shaped rotating shafts 72 and 72 that protrudes towards the left and right support plates 23 and 23 from lateral side portions 71b of the swing-portion body 71, left and right slide rails 73 and 73 that extend in the front-rear direction on the inner surface side of the swing-portion body 71, and left and right front stoppers 74 and 74 that are provided at the front ends of the slide rails 73 and 73 continuously with the slide rails 73 and 73.

The rotating shafts 72 and 72 are fitted into rotating shaft fitting holes 23a and 23a formed in the rear end portions of the left and right support plates 23 and 23. The rotating shafts 72 and 72 are fitted into the rotating shaft fitting holes 23a and 23a to an extent allowing the swing portion 70 to swing. The swing portion 70 is supported in a swingable manner, that is, swingable about the rear end portions of the left and right support plates 23 and 23.

The slide portion 80 includes a slide-portion body 81 that has an L-shape in cross-sectional view that extends in the front-rear direction while a front end extends upwards, a plate member 82 that is fixed to an upper portion of the slide-portion body 81, a cushion 83 that covers the plate member 82 and on which an elbow of the occupant is placed, and sliders 84 (only the left slider 84 is illustrated in FIG. 5) that are fixed to lateral side portions 81b of the slide-portion body 81 and that are capable of being slid on the slide rails 73 and 73. When the sliders 84 come in contact with front stoppers 74, forward movement of the slide portion 80 is restricted.

Figure 6A:
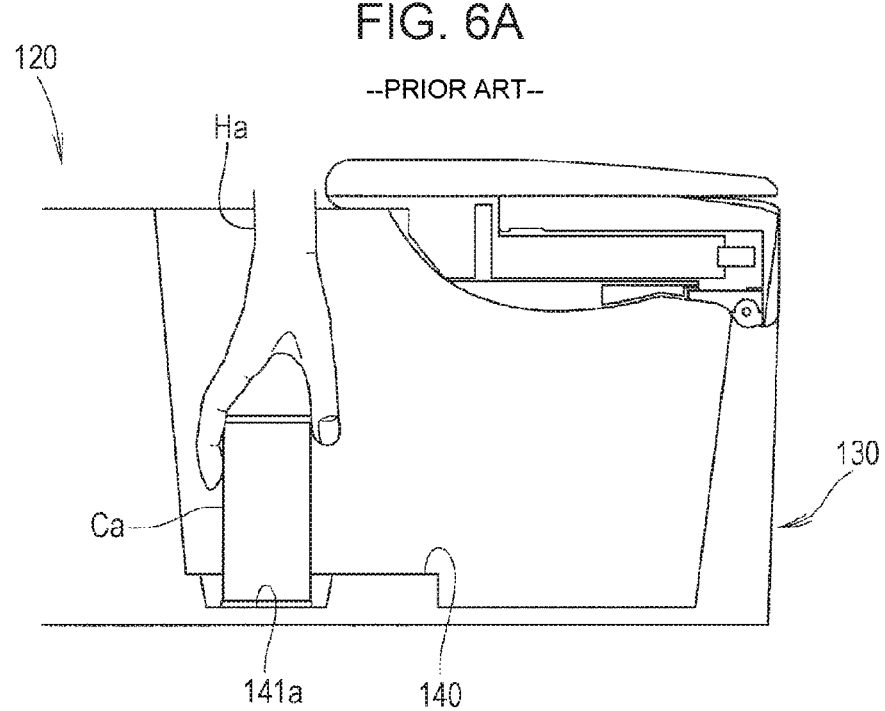
FIGS. 6A and 6B are diagrams for comparing the vehicular console box according to the exemplary embodiment (FIG. 6B) illustrated in FIG. 3 and a vehicular console box according to a comparative example (FIG. 6A, prior art).

As illustrated in a comparative example of FIG. 6A, in a console box 120 that has a drink holder only at a bottom portion 140, even the short beverage container Ca has to be supported at the bottom portion 140. When the short beverage container Ca is placed on a drink holder 141a (a bottom portion side container support) formed in the bottom portion 140, the beverage container Ca will be supported at a position deep inside a console body 130. In such a case, the occupant needs to reach his/her hand Ha deep into the console body 130 in order to take out the beverage container Ca, which is inconvenient.

Figure 6B:
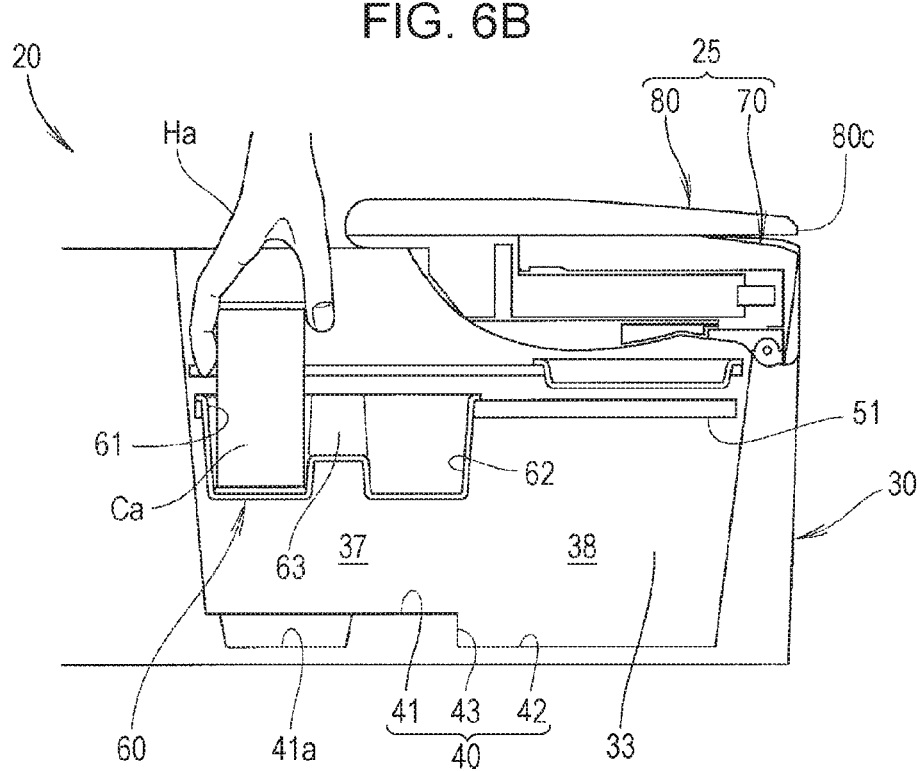

As illustrated in the exemplary embodiment of FIG. 6B, the drink holder 60 slides in the front-rear direction at a position that is higher than the position of the bottom portion 40. Accordingly, compared with a case in which the beverage container is supported at the bottom portion (see the comparative example of FIG. 6A), the short beverage container Ca can be supported at a shallower position of the console body 30. Since the short beverage container Ca is disposed at a shallower position, the occupant can easily take out the short beverage container Ca. In other words, the short beverage container Ca is received at a position where the hand Ha can easily reach the short beverage container Ca.

Furthermore, in a state in which the slide portion 80 is retracted to the retraction limit, a rear end 80c of the slide portion 80 substantially corresponds to a rear end of the swing portion 70. A length of the slide portion 80 in the front-rear direction is configured so that the rear end 80c of the slide portion 80 is positioned in front with respect to a rear end of the console body 30.

The rear end 80c of the slide portion 80 can be prevented from protruding out into the rear seat side when the slide portion 80 is slid to the retraction limit. Accordingly, when the slide portion 80 is slid, the occupant on the rear seat can be prevented from feeling oppressed and the interior space can be kept comfortable.

Figure 7:
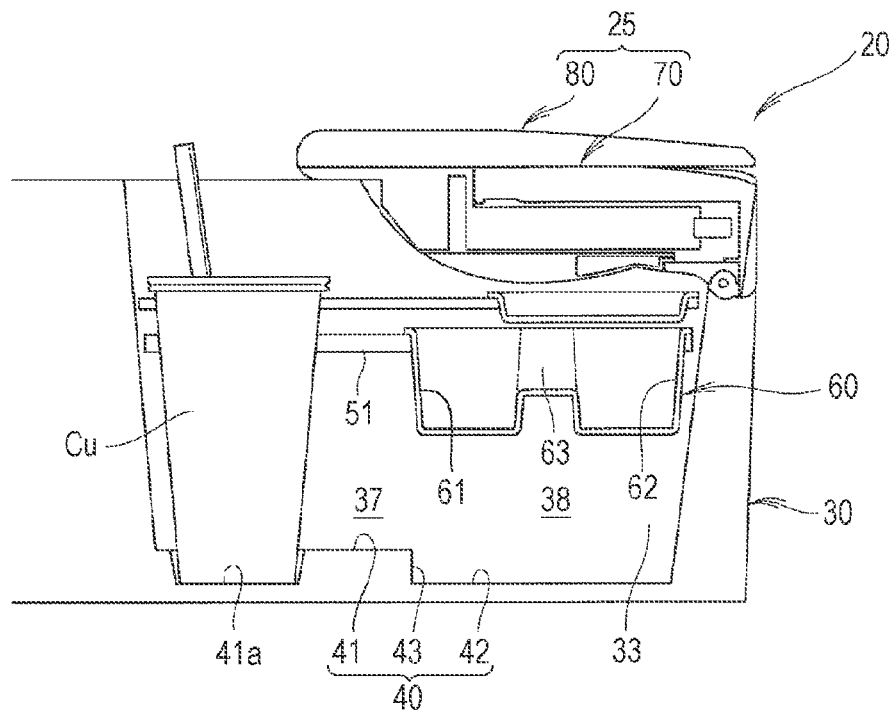
FIG. 7 is a diagram for describing an operation of the drink holder and the small articles tray illustrated in FIG. 3.

As illustrated in FIG. 7, the drink holder 60 can be slid in the front-rear direction. When receiving a tall beverage container Cu, the drink holder 60 is retracted. By retracting the drink holder 60, the tall beverage container Cu can be directly placed on an upper surface of the bottom portion 40.

Suppose the tall beverage container Cu is supported by the drink holder 60. In such a case, the upper end of the tall beverage container Cu largely protrudes from the upper edge of the console body 30. In the above case, the occupant needs to bend his/her elbow to take out the tall beverage container Cu. Accordingly, by placing the tall beverage container Cu on the bottom portion 40 that is positioned at a lower portion, the tall beverage container Cu can be taken out easily.

Figure 8:
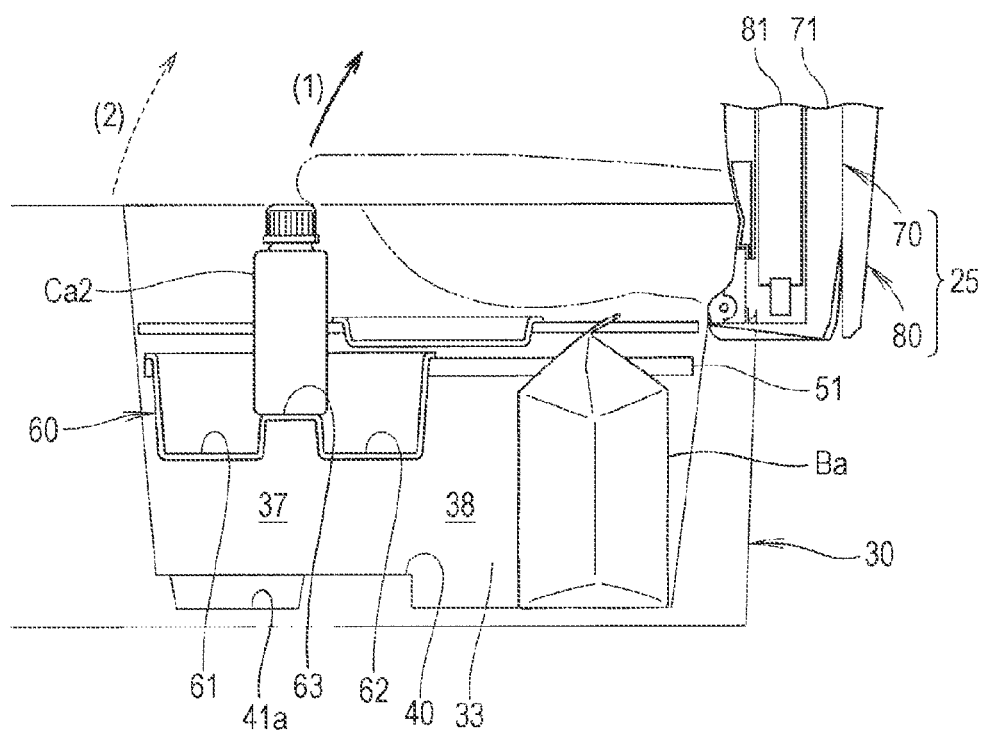
FIG. 8 is a diagram for describing an operation of the armrest illustrated in FIG. 3.

As illustrated in FIG. 8, a further short beverage container Ca2 (a bottle of energy drink, for example) is received in the drink holder 60. The third holder side container support 63 that can support the further shorter beverage container Ca2 is formed in a continuous manner with the first holder side container support 61 and the second holder side container support 62 so as to communicate the first holder side container support 61 and the second holder side container support 62 to each other. The above is beneficial since the drink holder 60 will be allowed to support a short beverage container Ca2 without increasing the size of the drink holder 60.

Furthermore, a bottom surface of the third holder side container support 63 is formed at a position that is higher than the positions of a bottom surface of the first holder side container support 61 and a bottom surface of the second holder side container support 62. Accordingly, the further short beverage container Ca2 can be taken out easily.

Belongings other than the beverage container such as, for example, a paper bag Ba, can also be received in the rear chamber 38. As illustrated by arrow (1), the swing portion 70 is swung rearwardly and upwardly. At this time, the swing portion 70 is swung while the slide-portion body 81 is received in the swing-portion body 71.

Arrow (2) depicted by a broken line illustrates a trace of the armrest 25 when the armrest 25 is swung without sliding the slide portion 80. In such a case, the trace of the swing is larger. On the other hand, the trace of the armrest 25 whose overall length has been shortened by sliding the slide portion 80 towards the rear is, as illustrated by arrow (1), smaller. Accordingly, the moving amount of the arm of the occupant who is operating the armrest 25 can be reduced leading to increased operability.

Second Exemplary Embodiment

A second exemplary embodiment of the disclosure will be described next with reference to the drawings.

Figure 9A:
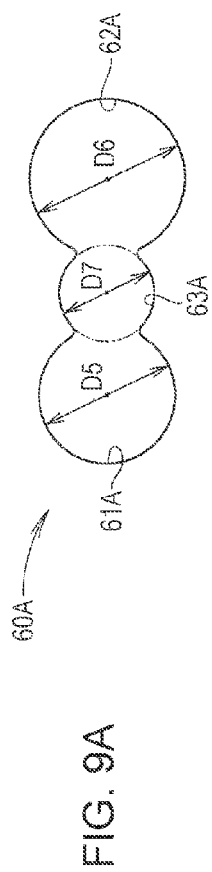
FIGS. 9A and 9B are diagrams for describing a vehicular console box according to a second exemplary embodiment of the disclosure.
Figure 9B:
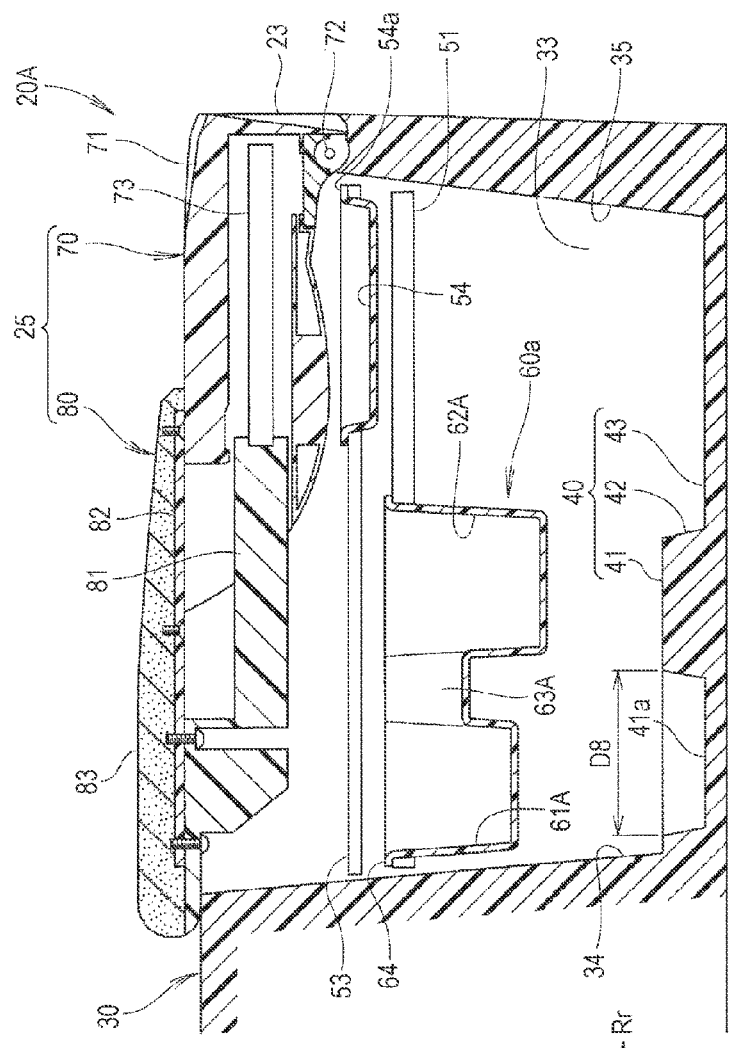

FIG. 9B illustrates a cross-sectional composition of a console box 20A according to the second exemplary embodiment in a manner corresponding to FIG. 3 described above. In the console box 20A according to the second exemplary embodiment, the drink holder 60 of the console box 20 according to the first exemplary embodiment is changed to a drink holder 60A. Other configurations are the same as those of the first exemplary embodiment, and the reference numerals thereof will be reused and detailed description thereof will be omitted.

As illustrated in FIGS. 9A and 9B, the drink holder 60A includes a first holder side container support 61A that is capable of receiving a short first beverage container, a second holder side container support 62A that is capable of receiving a short second beverage container, and a third holder side container support 63A that is formed so as to communicate the first holder side container support 61A and the second holder side container support 62A to each other.

A diameter D6 of the second holder side container support 62A is larger than a diameter D5 of the first holder side container support 61A. On the other hand, the diameter D6 of the second holder side container support 62A is smaller than a diameter D8 of the bottom portion side container support 41a. A depth of the second holder side container support 62A is formed deeper than a depth of the first holder side container support 61A.

A diameter D7 of the third holder side container support 63A is smaller than the diameter D5 of the first holder side container support 61A. Furthermore, a depth of the third holder side container support 63A is formed shallower than the depth of the first holder side container support 61A.

For example, the first holder side container support 61A is anticipated to receive a can of canned coffee. The second holder side container support 62A is anticipated to receive a can of soft drink that is larger than the can of canned coffee. The third holder side container support 63A is anticipated to receive a bottle of energy drink.

Even if the drink holder 60A described above is employed, the specific effects of the disclosure can still be obtained. Additionally, the diameter D6 of the second holder side container support 62A is formed larger than the diameter D5 of the first holder side container support 61A and the depth of the second holder side container support 62A is formed deeper than the depth of the first holder side container support 61A. Accordingly, more varieties of beverage containers can be appropriately supported.

Note that if a can of soft drink is received in the second holder side container support 62A, for example, the second holder side container support 62A can be positioned on the front side. The drink holder 60A is slidably supported by being placed on the upper surfaces of the drink holder rails 51. Accordingly, the drink holder 60A can be easily lifted away from the drink holder rails 51. The positions of the first holder side container support 61A and the second holder side container support 62A can be easily changed to appropriate positions.

Note that a recess with a bottom has been described as an example of each holder side container support of the console box according to be disclosure; however, a through hole may be employed on condition that the beverage can be fixed thereto. In other words, each holder side container support is not limited to a recess with a bottom.

Furthermore, based on the relationship with the seats, a chamber for receiving the beverage container may be formed on the rear side and a chamber for receiving the belongings other than the beverage container may be formed on the front side.

Other than the above, the configurations illustrated in the exemplary embodiments are examples and may be appropriately altered as long as the operation and effect of the disclosure are performed and obtained.

The vehicular console box of the disclosure is suitable to be used in passenger cars. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A vehicular console box, comprising:
a console body having an opened upper portion, the console body being attached to a floor panel of a vehicle;
the console body including
a bottom portion positioned on an upper surface of the floor panel, and
sidewall portions each standing from a corresponding one of two ends of the bottom portion located in a vehicle width direction;
rails extending in a front-rear direction, the side wall portions including the rails; and
a drink holder supported by the rails slidably along the front-rear direction,
wherein the bottom portion includes a front portion, a rear portion and a substantially vertical step portion at a border between the front portion and the rear portion, the rear portion having a height lower than the front portion,
the front portion of the bottom portion includes a bottom portion side container support formed therein in a concave manner, the bottom portion side container support being capable of supporting a tall beverage container that is larger than a short beverage container that is supported by the drink holder,
the console body further comprises a front chamber above the front portion as a front storage space and a rear chamber above the rear portion as a rear storage space,
the drink holder includes a holder side container support formed therein, the holder side container support being capable of supporting the short beverage container,
the holder side container support and the bottom portion side container support have a substantially circular shape in plan view, and
a diameter of the bottom portion side container support is larger than a diameter of the holder side container support.

2. The vehicular console box according to claim 1, wherein the respective rails protrude from an inner surface of a corresponding one of the sidewall portions.

3. The vehicular console box according to claim 1, further comprising upper rails disposed above the rails and extending in the front-rear direction; and
a tray supported by the upper rails slidably along the front-rear direction.

4. The vehicular console box according to claim 1, wherein the drink holder is detachably supported by the rails.

5. The vehicular console box according to claim 1, wherein the holder side container support includes a recess with a bottom.

6. A vehicle comprises the vehicular console box according to claim 1.

7. The vehicular console box according to claim 1, wherein the drink holder includes a flange extending horizontally from the holder side container support,
wherein the flange includes a bottom surface contacting an upper surface of the rails.

8. The vehicular console box according to claim 1, wherein the bottom portion side container support is disposed at a position located on a front side of a center of the front portion in the front-rear direction.

9. The vehicular console box according to claim 1, wherein the step portion is disposed at a substantial middle of the bottom portion in the front-rear direction.

10. The vehicular console box according to claim 1, wherein the bottom portion side container support has a truncated cone shape tapered toward a bottom.

11. The vehicular console box according to claim 1, wherein the drink holder is configured to slide such that the holder side container support slides to a position right above the bottom portion side container support.

12. The vehicular console box according to claim 1, wherein the drink holder is configured to slide such that the holder side container support slides to a position right above the bottom portion side container support such that respective top portions of the short beverage container and the tall beverage container are positioned at the substantially same place with respect to a vertical direction, the front-rear direction and the vehicle width direction.

* * * * *